United States Patent
Kasher (10) Patent No.: US 9,801,226 B2
(45) Date of Patent: Oct. 24, 2017

(54) METHODS AND ARRANGEMENTS TO IMPROVE LINK WITH OUT-OF-BAND INFORMATION

(71) Applicant: Intel IP Corporation, Santa Clara, CA (US)

(72) Inventor: Assaf Kasher, Haifa (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/142,840

(22) Filed: Dec. 28, 2013

(65) Prior Publication Data

US 2015/0189686 A1 Jul. 2, 2015

(51) Int. Cl.
*H04W 76/02* (2009.01)
*H04W 88/06* (2009.01)
*H04M 1/725* (2006.01)
*H04W 84/18* (2009.01)
*H04W 4/00* (2009.01)

(52) U.S. Cl.
CPC ....... *H04W 76/027* (2013.01); *H04M 1/7253* (2013.01); *H04W 4/008* (2013.01); *H04W 76/02* (2013.01); *H04W 84/18* (2013.01); *H04W 88/06* (2013.01); *H04M 2250/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,457,026 B1* | 6/2013 | Ho | | H04B 7/0617 342/359 |
| 2008/0129881 A1* | 6/2008 | Shao | | H04W 28/06 348/723 |
| 2013/0143604 A1* | 6/2013 | Kashimoto | | H04M 1/7253 455/457 |
| 2014/0073246 A1* | 3/2014 | Sip | | H04W 76/025 455/41.2 |

(Continued)

OTHER PUBLICATIONS

An, X., Sum, C.S., Prasad, R.V., Wang, J., Lan, Z., Wang, J., Hekmat, R., Harada, H. and Niemegeers, I., Sep. 2009. Beam switching support to resolve link-blockage problem in 60 GHz WPANs. In Personal, Indoor and Mobile Radio Communications, 2009 IEEE 20th International Symposium on (pp. 390-394). IEEE.*

(Continued)

*Primary Examiner* — Ankur Jain
*Assistant Examiner* — Zhitong Chen (57) ABSTRACT

Logic may facilitate the establishment and maintenance of a link in a 60 gigahertz band. Logic may determine via out-of-band information that a distance is not likely a reason for failure of a link in the 60 gigahertz band. Logic may determine via out-of-band information that the distance between devices is within a range of the link in the 60 gigahertz band. Logic may determine via out-of-band information that an orientation of one of the devices may be a cause of a poor or failed 60 GHz connection. Logic may display a message to a user related to possible issues with establishing or maintaining a 60 GHz connection. Logic may determine that refining a beamforming directional granularity may improve chances of maintaining a link in the 60 gigahertz band. And logic may synch devices via an out-of-band connection.

23 Claims, 5 Drawing Sheets

(56) References Cited

U.S. PATENT DOCUMENTS

2014/0218236 A1* 8/2014 Sadeghi ............... H04W 16/28
                                                     342/367
2014/0370925 A1* 12/2014 Leiba ........................ 455/505

OTHER PUBLICATIONS

Tsang, Y. Ming, and Ada SY Poon. "Detecting human blockage and device movement in mmWave communication system." In Global Telecommunications Conference (GLOBECOM 2011), 2011 IEEE, pp. 1-6. IEEE, 2011 (Tsang).*
Tsang, Y. Ming, and Ada SY Poon. "Detecting human blockage and device movement in mmWave communication system." In Global Telecommunications Conference (GLOBECOM 2011), 2011 IEEE, pp. 1-6. IEEE, 2011.*
WirelessHD Specification Version 1.1 Overview, May 2010.*

* cited by examiner

METHODS AND ARRANGEMENTS TO IMPROVE LINK WITH OUT-OF-BAND INFORMATION

TECHNICAL FIELD

Embodiments are in the field of wireless communications. More particularly, embodiments may involve implementing out-of-band technologies such as Bluetooth to improve an ability to establish a link in 60 Gigahertz communications or nearby frequencies.

BACKGROUND

Millimeter-wave (mmWave), also referred to as WiGig (Wireless Gigabit Alliance), wireless personal area network (WPAN) communication systems operating in the 60 Gigahertz (GHz) frequency band provide several Gigabits per second (Gbps) throughput to distances of about ten meters. A 60 GHz communication system is less robust than those at lower frequencies (for example, 2.4 GHz and 5 GHz bands) due to both oxygen absorption, which attenuates the signal over long range, and its short wavelength, which provides high attenuation through obstructions such as walls and ceilings. As a result, the use of directional antennas such as a phased antenna arrays or switching sectors is useful for 60 GHz applications to establish and conduct communications between devices.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

60 GHz communication (WiGig based) tend to rely on line of sight (LOS) transmission or on direct reflections. Sometimes, a user of a 60 GHz WiGig docking station may place a device such as a notebook, tablet or smartphone, in a position that puts the device's antennas in a direction that is not conducive to 60 GHz communication. If this happens before the initial connection with the docking station, the device may be unable to establish a link with the docking station and the user may not know that he has done something wrong or why the connection cannot be established.

Embodiments herein may implement out-of-band communications to determine a possibility of establishing a link in the 60 GHz band and help establish a link in the 60 GHz band by, e.g., troubleshooting the issues with establishing a link in the 60 GHz band between a device and, for example, a docking station.

In several embodiments, devices such as a docking station, a notebook, a tablet, and a smartphone may include other wireless technologies such as Bluetooth. Bluetooth, for instance, has roughly the same range for establishing a link as a WiGig based link operating in the 60 GHz band so Bluetooth can detect that the two devices are roughly within range for 60 GHz communication and communicate possible issues with establishing a link in the 60 GHz band if the link in the 60 GHz band is not established for some reason. Furthermore, a distance can be determined from the signal power for Bluetooth so logic can determine a refined distance to determine if the 60 GHz system should be able to establish a connection based upon a power measurement for the Bluetooth signal at each side of the link.

In some embodiments, once a Bluetooth connection has detected, the devices are within range for a 60 GHz communication and the devices can initiate a 60 GHz link. However, if starting a 60 Ghz link fails, or if a 60 GHz link operating in parallel failed to connect, then, based on the Bluetooth connection, the docking station and/or the device can display a message on the screen such as "Please point your device to the docking station or remove obstacles between them". Such a communication with the user can offer the user an opportunity to determine the problem with establishing and maintaining a link in the 60 GHz band between the device and the docking station as well as an opportunity to fix the problem.

In further embodiments, once Bluetooth establishes a connection between the devices and logic in one or both of the devices determines that the devices are within a range to establish a link in the 60 GHz band, the Bluetooth device may synchronize the devices so that one device, such a tablet can awake a wireless receiver just before the other device, such as the docking station, transmits a beacon for establishing the link in the 60 GHz band with the tablet. Note that both devices may transmit the beacons and may transmit a plurality of beacons.

Some embodiments implement other types of out-of-band communication. For instance, another form of Wi-Fi communication may also establish a connection between, e.g., a smartphone and a docking station. Such embodiments may facilitate a determination of the range based upon power or energy levels of the received Wi-Fi signals such as a received signal strength indicator (RSSI) and also facilitate synchronization of the devices for establishing a link in the 60 GHz band.

Several embodiments may also comprise logic to adjust a beamforming procedure for the link in the 60 GHz band in response to a failure to maintain a link in the 60 GHz band between two devices. Beamforming may generally be interpreted as a technique of using several antenna elements to spatially shape emitted electromagnetic waves transmitted from a wireless communication device. A transmitting device may employ any one of a variety of different methods to focus, concentrate, or "beam" the energy into a receiving device. Techniques to discover and direct energy between antenna arrays of peer devices is typically referred to as "beamforming" or "beam steering" or "beam searching." Beamforming generally attempts to steer an antenna beam at a transmitter while at the same time focusing a receiver antenna in the direction of incoming power from the transmitter. The transmitting device may focus the transmitted energy by, for example, adjusting or manipulating the magnitude and phase of the transmitted signals from individual antenna elements of an antenna array. Similarly, the receiving device may also manipulate one or more different antenna elements of an antenna array to concentrate the received signal. Such beamforming activities may require the transmitting and receiving devices to perform channel sounding to optimize the shape and direction of the beam.

In many embodiments, beamforming involves implementing a beam steering matrix to direct communications in a particular direction via constructive and destructive interferences between the communications waveforms. Part of the process of establishing communications between two devices using beamforming includes a determination of the best direction to transmit from a transmitter to a receiver (and vice versa) to maximize the signal power such as a RSSI. The transmitter typically performs a sector sweep (SS), transmitting packets in directional transmissions covering 360 degrees about the antenna array of the transmitter. The directions are angular and identified by sector numbers.

The process of determining the direction of the receiving device involves sector-level sweep (SLS), beam refinement protocol (BRP), and beam tracking (BT). SLS involves assigning a sector number to each directional transmission. For instance, the transmitter may select a granularity of, e.g., 45 degrees and transmit eight packets 45 degrees apart, each associated with a different sector number to allow the receiving device to choose the best sector for reception based upon reception of one or more of the packets.

When an established link in the 60 GHz band fails, however, logic of the, e.g., docking station may adjust the beamforming process to increase the number of sectors. For instance, the docking station may adjust the beamforming process to transmit packets every 20 degrees rather than every 45 degrees, transmitting 18 packets in a sector sweep rather than eight, to attempt to refine the direction of transmission to the receiver from the docking station to increase the signal power of the transmission at the receiver.

Further embodiments may also use out-of-band information such as information from accelerometers of a receiving device attempting to dock with the docking station to determine if the orientation of the receiving device may negatively impact the ability of the docking station to establish a link in the 60 GHz band. If the orientation information indicates that the receiving device is inverted, the docking station may display a message indicating that flipping the device over may facilitate establishment of the link in the 60 GHz band.

Various embodiments may be designed to address different technical problems associated with establishing and maintaining a link in the 60 GHz band. Other technical problems may include determining when a distance between devices is not a reason for a failed 60 GHz connection, informing a user when a distance between devices is not a reason for a failed 60 GHz connection, and/or the like.

Different technical problems such as those discussed above may be addressed by one or more different embodiments. For instance, some embodiments that address establishing and maintaining a link in the 60 GHz band may do so by one or more different technical means such as determining via out-of-band information that a distance is not likely a reason for failure of a link in the 60 GHz band, determining via out-of-band information that the distance between devices is within a range of the 60 GHz link, determining via out-of-band information that an orientation of one of the devices may be a cause of a poor or failed 60 GHz connection, determining that refining a beamforming directional granularity may improve chances of establishing a link in the 60 GHz band, displaying a message to a user related to possible issues with establishing or maintaining a 60 GHz connection, synching the devices via an out-of-band connection, and/or the like.

Some embodiments implement WirelessHD Specification Version 1.1D1, May 2010. Several embodiments may implement Ecma International, Standard ECMA-387, High Rate 60 GHz PHY, MAC and PALS, 2nd Ed., December 2010. Further embodiments may implement Wireless Gigabit Alliance, WiGig 1.1 specification, June 2011. Some embodiments implement Institute of Electrical and Electronic Engineers (IEEE) 802.11 systems such as IEEE 802.11ad systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/8020.11-2012.pdf).

Some embodiments implement Institute of Electrical and Electronic Engineers (IEEE) 802.15 systems such as IEEE 802.15.3 systems and other systems that operate in accordance with standards such as the IEEE 802.15, IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs), IEEE Computer Society, The Institute of Electrical and Electronics Engineers, Inc., 3 Park Avenue, New York, N.Y., 29 Sep. 2003.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity).

Some embodiments, implement the Bluetooth specification (e.g. BLUETOOTH SPECIFICATION Version 4.0, Bluetooth SIG, Inc., Publication date: 30 Jun. 2010). The embodiments, however, are not limited to these standards.

Several embodiments comprise Personal Basic Service Set (PBSS) Central Point, or PCP for and/or client devices of PCPs or stations (STAs) such as docking stations, routers, switches, servers, workstations, netbooks, mobile devices (Ultrabook, Laptop, Smart Phone, Tablet, and the like).

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Figure 1:
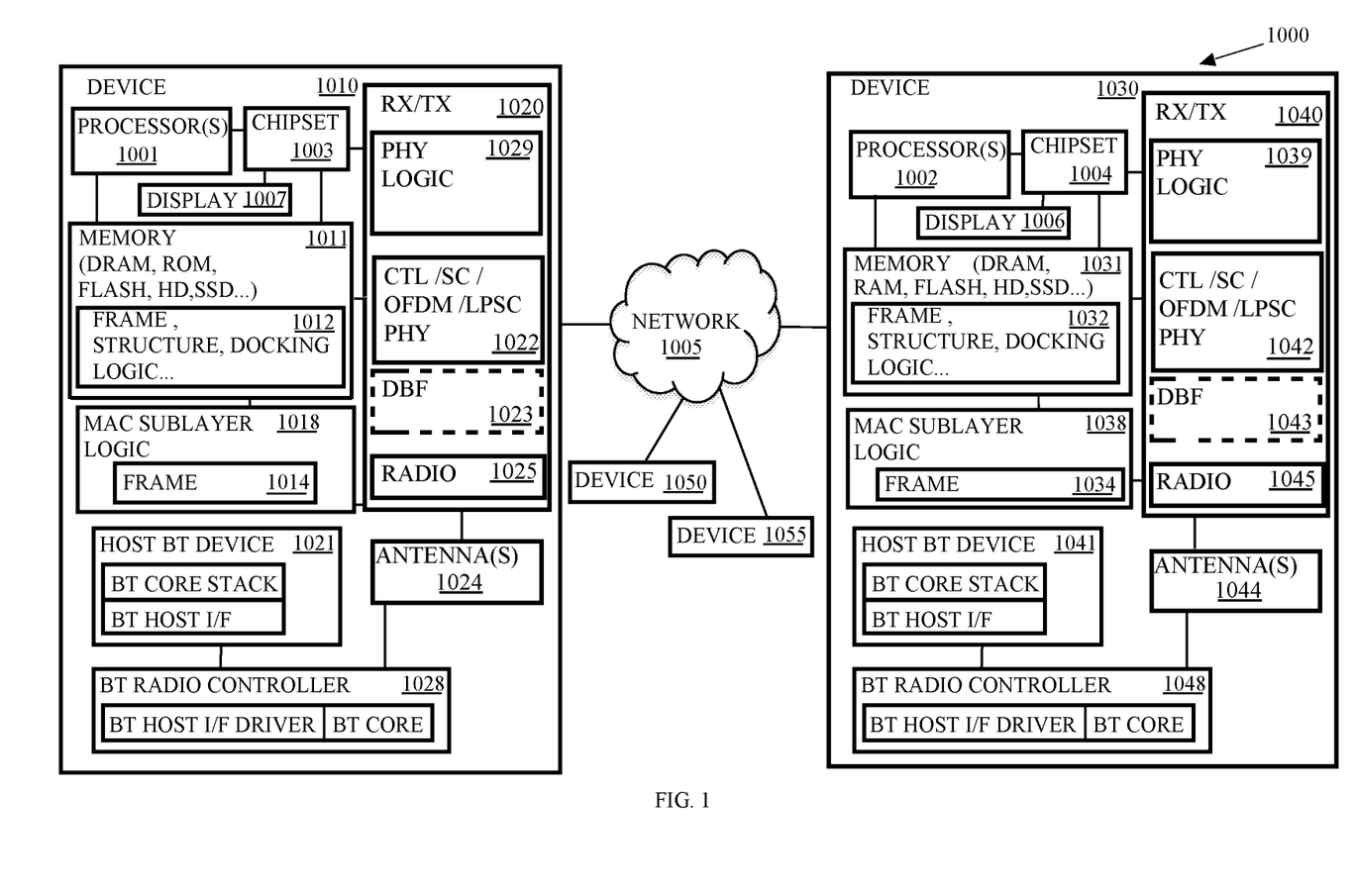
FIG. 1 depicts an embodiment of a wireless network comprising a plurality of communications devices with wireless communication capabilities as well as out-of-band communication capabilities.
Figure 1A:
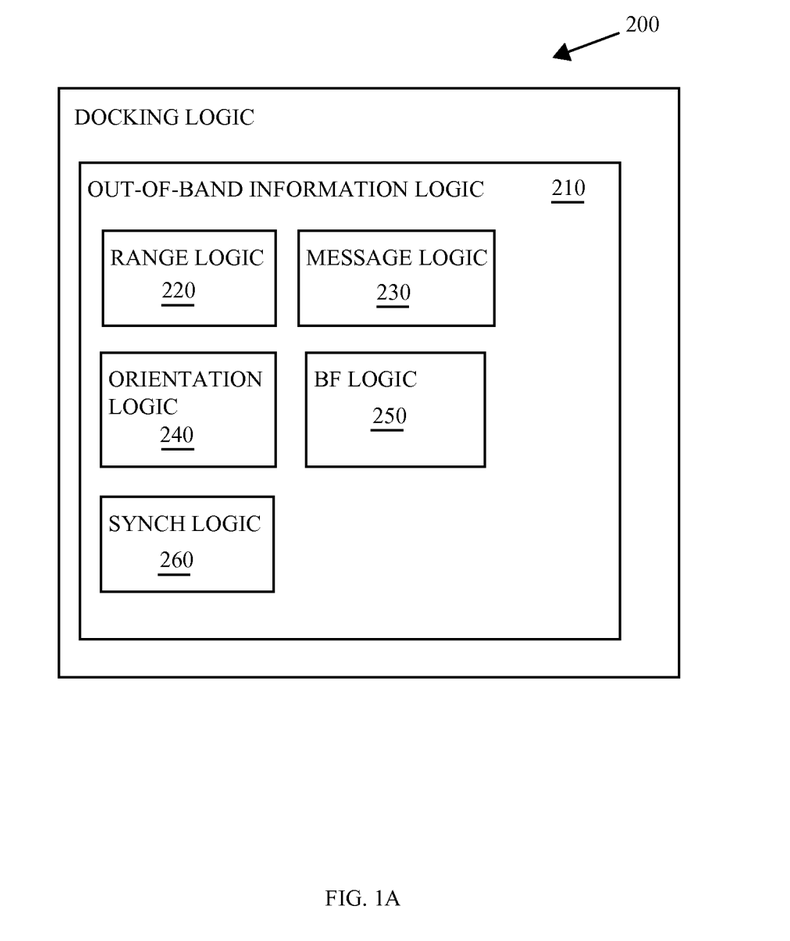

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise a docking station or other wireless-capable device. The communications device 1030 may comprise a low power communications device such as a consumer electronics device, a personal mobile device, or the like. And communications devices 1050 and 1055 may comprise printers, laptops, netbooks, cellular phones, smart phones, PDAs, or other wireless-capable devices. Thus, communications devices may be mobile or fixed.

The communications device 1010 may utilize antenna(s) 1024 to communicate within one or more stations, such as communication devices 1030, 1050, and 1055, via one or more antenna sectors. One of the stations, such as the communications device 1010, may act as a network coordinator (such as a Personal BSS Central Point, or PCP) to coordinate communications among the plurality of communication devices 1030, 1050, and 1055 and control access to the wireless medium. When acting as the network coordinator, the communications device 1010 may broadcast a beacon frame that indicates the length of a beacon interval during which communications are to take place. The various stations may receive the beacon frame and, thereby, become informed as to when the next beacon interval will occur.

Initially, the communications device 1010 may determine a frame 1014 such as a discovery beacon frame to transmit. The frame 1014 may be a discovery beacon that is transmitted to attempt to establish a link in the 60 GHz band with nearby devices such as the communications devices 1030, 1050, and 1055. In many embodiments, the discovery beacon may be transmitted via an omni-directional transmission. In other embodiments, the discovery beacon may be transmitted via a directional transmission in one or more sectors about the antenna(s) 1024 of the communications device 1010.

The communications device 1010 may transmit the discovery beacon via the physical layer device (PHY), transceiver (RX/TX) 1020. In many embodiments, transceivers 1020 and 1040 implement up to four different PHY layers: Control PHY, SC (single carrier) PHY, OFDM PHY and low-power SC PHY (LPSC PHY). Control PHY is modulation and coding scheme 0 (MCS 0). SC starts at MCS 1 and ends at MCS 12; OFDM PHY starts at MCS 13 and ends at MCS 24; and LPSC starts at MCS 25 and ends at MCS 31. MCS 0 to MCS 4 may be mandatory PHY MCSs. For instance, the MAC sublayer logic 1018 may generate the discovery beacon frame and transmit the frame to the PHY logic 1039 of transceiver (RX/TX) 1020. The PHY logic 1039 may input the frame as a data stream into an encoder of the transceiver (RX/TX) 1020. From the encoder, the data stream may be processed by a series of modules including an interleaver, a modulator, a CTL/SC/OFDM/LPSC PHY 1022, a digital beamformer 1023, and a radio 1025 prior to being transmitted by the antenna(s) 1024.

In some embodiments, the communications devices 1050 and 1055 may receive the discovery beacon and may respond with association request frames via SC PHY. The communications device 1010 may respond to the association request frames with association response frames to establish links in the 60 GHz band operating at or near 60 GHz with the communications device 1010 via the transceiver (RX/TX) 1020.

In the present embodiment, the communications device 1030 did not receive a discovery beacon frame from the communications device 1010. The communications device 1030 may be a tablet of a user and the user may have placed the tablet upside down on a desk. Furthermore, a book may lie on the desk between the tablet and the communications device 1010. In the present embodiment, the book may be directly in the path between the antenna(s)s 1044 for a link in the 60 GHz band in the communications device 1030 and the antenna(s) 1024 for the link in the 60 GHz band in the communications device 1010. In several embodiments, the tablet may be designed such that the antenna is correctly oriented to transmit to the communications device 1010 if the communications device 1030 is not inverted (upside down).

The communications device 1030 may also comprise a Bluetooth (BT) system illustrated as a host BT device 1041 and a BT radio controller 1048. The user of the communications device 1030 may have paired the communications device 1030 with the communications device 1010 previously. So, when the user brings the communications device 1030 near the communications device 1010, the docking logic in memory 1012 being executed by the processor(s) 1001 may instruct the host BT device 1021 to initiate a scan of the area for devices. Upon placement of the communications device 1030 on the desk, the host BT device 1021 may detect the presence of and automatically connect to the communications device 1030 via the BT radio controller 1028 to establish a BT connection. For example, the host BT device 1021 may transmit a packet through the BT host I/F driver through a bus and to the BT radio controller 1028 at the BT host I/F driver to instruct a BT core to scan for nearby BT devices. The BT core may scan for BT communications and, upon determining that there is a BT device nearby or determining that there is no detectable BT device nearby, the BT core may generate a response packet for the host BT device 1021. The BT core may also transmit an advertisement to other BT devices. The BT radio controller 1028 may comprise the BT core to execute physical layer BT functionality such as generating packets for transmission to other BT devices and transmitting the communications to the other BT devices. The BT radio controller 1028 may also comprise the BT core to receive BT communications destined for the host BT device 1021 and transmit a corresponding packet to the host BT device 1021.

The docking logic in memory 1012 may determine that the communication device 1030 has previously docked via the link in the 60 GHz band and that a preference is set in the memory 1011 that indicates that the communications device 1010 should automatically dock with the communications device 1030 via a link in the 60 GHz band. In further embodiments, the user may indicate a desire to connect the communications device 1030 to the communications device 1010 with a link in the 60 GHz band via an input to the communications device 1010.

The docking logic of the communications device 1010 may then instruct the MAC sublayer logic 1018 to transmit a discovery beacon to connect with the communications device 1030. If the communications device 1010 does not receive a response to the discovery beacon from the communications device 1030, the docking logic of the communications device 1010 may determine that the attempted 60 GHz connection has failed. In particular, the docking logic of the communications device 1010 may assume that if the BT connection is successful, the communications device 1030 is within range of the communications device 1010 for the purposes of establishing a link in the 60 GHz band. In some embodiments, the docking logic of the communications device 1010 may determine a message to display via display 1007 to indicate to the user that the connection has failed and an issue with establishing the 60 GHz connection is probably a problem with the orientation of the communications device 1030 or an object in the path between the communications device 1030. In some embodiments, the docking logic of the communications device 1010 may determine and display a message indicating that if an object is between the communications device 1030 and the communications device 1010, that the object may be obstructing the establishment of the link in the 60 GHz band. In further embodiments, the docking logic of the communications device 1010 may determine and display a message on display 1007 indicating that the communications device 1030 should not be upside down and/or the antenna should be directed towards the communications device 1010.

In several embodiments, the communications device 1030 may comprise docking logic in the memory 1032 and the docking logic of the communications device 1030 may also determine that the link in the 60 GHz band must have failed after the expiration of a certain period of time after the establishment of the BT connection with the communications device 1010. In some embodiments, the communications device 1030 may transmit a probe request to attempt to establish the link in the 60 GHz band via the transceiver 1040 after establishment of a BT connection. In such embodiments, the communications device 1030 may determine that the attempt has failed due to an obstruction or the orientation of the communications device 1030. In several embodiments, the docking logic of the communications device 1030 may determine and display a message indicating that if an object is between the communications device 1030 and the communications device 1010, that the object may be obstructing the establishment of the link in the 60 GHz band. In further embodiments, the docking logic of the communications device 1030 may determine and display a message on display 1006 indicating that the communications device 1030 should not be upside down and/or the antenna should be directed towards the communications device 1010.

In some embodiments, the docking logic of the communications device 1010 may, prior to displaying the message, concurrently with displaying the message, or after displaying the message, synchronize the transmission of beacon frames and a receive mode between the first station and the second station via the BT connection. In several embodiments, the communications device 1010 may transmit a package via the BT connection to the communications device 1030 that includes an indication of time, referred to generally as a timestamp, such as an indication of time generated by timing synchronization functions (TSFs). In further embodiments, the communications device 1010 may transmit a package via the BT connection to the communications device 1030 that includes an indication of a beacon time.

The host BT device 1041 may receive the timestamp and the beacon time and communicate these values to the docking logic of the communications device 1030. The docking logic of the communications device 1030 may pass the timestamp and the beacon time to the MAC sublayer logic 1038 to synchronize the communications device 1030 with the communications device 1010 for the purposes of waking to receive a beacon such as a discovery beacon. In further embodiments, additional information of the discovery beacon may be transmitted to the communications device 1030 via the BT connection to coordinate receipt of one or more sector sweep beacons by the communications device 1030. In other words, the association process may be handled via the BT connection and the communications device 1030 may awake for a sector sweep transmission from the communications device 1010 for the purposes of selecting the best sector in which to receive communications from the communications device 1010.

In many embodiments, the docking logic of the communications device 1010 may, prior to displaying the message, concurrently with displaying the message, or after displaying the message, determine a distance based upon a power indication associated with receipt of a BT signal by the second station and determine that the distance is within a range associated with the link in the 60 GHz band. In particular, the power indication of a signal received via the BT connection may be converted into a rough estimate of the range of the communications device 1030 from the communications device 1010. The docking logic of the communications device 1010 may determine that the distance of the communications device 1030 from the communications device 1010 is probably or definitely within the range of the link in the 60 GHz band created by the transceiver 1020. As a result, the docking logic of the communications device 1010 may confirm more accurately that an obstruction or orientation issue is causing the failure to connect via the link in the 60 GHz band. In several embodiments, the docking logic of the communications device 1030 may perform a similar calculation based upon receipt of the signal via the BT connection from the communications device 1010 and also display a message to the user indicating that an obstruction or orientation issue is preventing the link in the 60 GHz band.

In further embodiments, the docking logic of the communications device 1010 may, prior to displaying the message, concurrently with displaying the message, or after displaying the message, query the communications device 1030 via the BT connection about sensor information indicative of the orientation of the communications device 1030. For example, after determining that the establishment of the link in the 60 GHz band failed, the docking logic of the communications device 1010 may transmit a query to the communications device 1030 to confirm whether or not the communications device 1030 is oriented correctly. The docking logic of the communications device 1030 may determine the orientation of the communications device 1030 based upon built-in sensors such as accelerometers and may respond via the BT connection. In some embodiments, the docking logic of the communications device 1030 may determine that the orientation is inverted and may respond with an indication of the same to the communications device 1010. In some embodiments, the docking logic of the communications device 1030 may determine message from the memory 1032 related to informing the user to correct the orientation of the communications device 1030 and may display the message on the display 1006.

In response to receiving a message from the docking logic of the communications device 1030 indicating that the communications device 1030 is inverted, the docking logic of the communications device 1010 may determine a message from the memory 1012 indicating that the user's device is inverted, or upside down, and may display the message.

After the obstruction is removed, the communications device 1030 is turned upright, and/or the communications device 1030 associates through the BT connection and responds to a directional communication from the communications device 1010, a link in the 60 GHz band may be established. For instance, the communications device 1010 may act as an initiating station to initiate a beamforming time (BFT) for the communications device 1030. When the communications device 1010 is the initiator, the communications devices 1030, 1050, and 1055 may be referred to as responding stations, or responders. The communications device 1010 may announce a number of sector-sweep (SS) slots of a BFT period and generate a number of SS frames within each SS slot. The communications device 1010 may receive one or more SS frames from one or more of the responding stations within one or more of the SS slots of the BFT period. Further, the communications device 1010 may transmit one or more SS feedback frames to the responding stations to indicate a desired or preferred antenna configuration that the responding station(s) should use when communicating with the communications device 1010. The indicated antenna configuration may refer to a particular antenna sector via a sector identifier or sector number.

In some embodiments, if the link in the 60 GHz band fails after being established and beamformed, the docking logic of the communications device 1010 may determine to increase the number of sectors associated with beamforming in response to the failure to reestablish the connection via the link in the 60 GHz band. Increasing the number of sectors used in the beamforming process can increase the granularity with which the directions of communications between the communications device 1010 and 1030 are selected. Increasing the granularity may increase the received signal strength at the communications device 1010 and 1030, which may decrease the likelihood of another failed connection.

In several embodiments, the docking logic of the communications device 1030 may determine establishment of a BT connection between the communications device 1030 and the communications device 1010; receive a communication via BT connection indicating a synchronization time for associating with the communications device 1010 via a beacon transmission; and wake a 60 GHz system such as the transceiver 1040 at the synchronization time to associate with the second station. For example, the docking logic of the communications device 1030 may coordinate receipt of a discovery beacon from the communications device 1010 and awake in a receive mode in time to receive a transmission of the discovery beacon from the communications device 1010. In further embodiments, the docking logic of the communications device 1030 may coordinate transmission of a discovery beacon to the communications device 1010 or another device and awake in a transmit mode to transmit the discovery beacon to the communications device 1010 or other device at the synchronization time.

In many embodiments, the communications devices 1010 and 1030 may implement Bluetooth technology for communications. The communications devices 1010, 1030 may comprise memory 1011, 1031; a host BT device 1021, 1041; and a BT radio controller 1028, 1048. The memory 1011, 1031 can be any one or more of a number of different types of volatile and non-volatile data storage devices such as random access memory such as Dynamic Random Access Memory (DRAM) buffers, registers, and cache; read only memory; flash memory; solid state drive; hard disk drive; optical drive; and/or the like. The memory 1011, 1031 may accommodate BT applications, BT profiles, preferences, applications and other code, phonebooks, and the like. For instance, the memory 1011 may comprise a preference related to advertising the existence of the BT capabilities of the communications device 1010, scanning to discover BT devices such as host BT device 1041, initiating connections with other BT devices, establishing connections with BT devices, and/or time periods to remain in standby mode.

The host BT device 1021, 1041 may comprise a BT host interface (I/F) driver for communications with the BT radio controller 1028, 1048. In some embodiments, the BT host I/F driver may comprise a host controller interface (HCI). In other embodiments, the BT host I/F driver may not comprise a host controller interface (HCI) but may comprise one or more other types of interfaces such as direct interfaces or some manufacturer specific interfaces.

The host BT device 1021, 1041 may be an entity defined as all of the layers below the non-core profiles and above the interface such as an HCI with the BT radio controller 1028,

1048. A radio controller may be an entity defined as all of the layers below the interface. An implementation of the host BT device 1021, 1041 and the BT radio controller 1028, 1048 may contain the respective parts of the interface. The host BT device 1021, 1041 may comprise logic including hardware and code to implement the host device functionality and the BT radio controller 1028, 1048 may comprise logic including hardware and code to implement the radio controller and to transmit and receive BT communications.

The host BT device 1021, 1041 may interpret certain BT profiles stored in memory 1011, 1031. The profiles define the possible applications that work with the device. BT profiles are general behaviors through which BT enabled devices communicate with other BT devices. Bluetooth technology defines a wide range of profiles that describe many different types of use cases. The host BT devices 1021, 1041 may perform an application's task by using, for each profile, particular options and parameters at each layer of the stack that are associated with the profile.

The configuration information regarding a profile is in the upper layers of a Bluetooth stack, typically an application layer. The proper profile for a device must be used to establish communication with the device. For example, a device with a profile for a headset may not work with a printer and vice versa. Often times, the devices are also manufacturer and product specific. The various available profiles may change over time and new profiles may be developed.

In some embodiments, the host BT device 1021, 1041 may comprise a part of the main OS for the communications device 1010, 1030; may execute on one or more main processor(s) 1001, 1002 for the communications device 1010, 1030; and may implement a main OS protocol stack for the BT communications.

The communications device 1030 may comprise a host BT device 1041. In some embodiments, the host BT device 1041 may comprise a low power OS for operating the communications device 1030 at a minimal power consumption level or a reduced power consumption level. In such embodiments, BT profiles and applications in the host BT device 1041 may execute minimal necessary functionality, allowing the main processor(s) 1002 and associated hardware to enter a sleep mode, or low power consumption mode.

The network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The processor(s) 1001, 1002 may couple with some of the memory 1011, 1031 directly such as one or more levels of cache and couple with some of the memory 1011, 1031, a display 1007, 1006, a transceiver 1020, 1040, and a host Bluetooth (BT) device 1021, 1041 via a chipset 1003, 1004. The chipset 1003, 1004 may comprise a memory controller, a display controller, and/or other peripheral devices and connections.

The memory 1011 and 1031 may be coupled with the MAC sublayer logic 1018, 1038 and/or may be coupled with the PHY device, transceiver 1040. In many embodiments, the memory 1011 and 1031 may store the frames and/or the frame structures, frame headers or portions thereof, and the memory 1011 and 1031 may store one or more messages related to issues with establishing a link in the 60 GHz band. In many embodiments, the frames may comprise fields based upon the structure of the standard frame structures identified in IEEE 802.11. Note that the memory is shown as a block but may be part of any subcomponent in the communications devices 1010 and 1030. For instance, the memory 1011, 1031 may be part of or coupled with the PHY logic 1029, 1039 and/or the MAC logic 1018, 1038.

The MAC sublayer logic 1018, 1038 may comprise logic to implement functionality of the MAC sublayer of the data link layer of the communications device 1010, 1030. The MAC sublayer logic 1018, 1038 may generate the frames such as management frames, data frames, and control frames, and may communicate with the PHY logic 1029, 1039. The PHY logic 1029, 1039 may generate physical layer protocol data units (PPDUs) based upon the frames 1014, 1034. More specifically, the frame builders may generate frames 1014, 1034 and the data unit builders of the PHY logic 1029, 1039 may prepend the frames 1014, 1034 with preambles to generate PPDUs for transmission via a physical layer (PHY) device such as the transceivers (RX/TX) 1020 and 1040.

The frame 1014, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame.

The communications devices 1010, 1030, 1050, and 1055 may each comprise a transmitters and receivers such as transceivers (RX/TX) 1020 and 1040. In many embodiments, transceivers 1020 and 1040 implement (CTL/SC/OFDM/LPSC PHY) 1022, 1042 with orthogonal frequency-division multiplexing (OFDM). CTL/SC/OFDM/LPSC PHY 1022, 1042 implements a method of encoding digital data on multiple carrier frequencies. OFDM may comprise a frequency-division multiplexing scheme used as a digital multi-carrier modulation method. A large number of closely spaced orthogonal subcarrier signals are used to carry data. The data is divided into several parallel data streams or channels, one for each subcarrier. Each subcarrier is modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask. The nulling of the direct component (DC) may be used to simplify direct conversion receiver designs. And guard intervals may be inserted between symbols such as between every OFDM symbol as well as between the short training field (STF) and long training field (LTF) symbols in the front end of the transmitter during transmission to avoid inter-symbol interference (ISI), which might result from multi-path distortion.

Each transceiver 1020, 1040 comprises a radio 1025, 1045 comprising an RF transmitter and an RF receiver. The RF transmitter comprises an CTL/SC/OFDM/LPSC PHY 1022, which impresses digital data, OFDM symbols encoded with tones, onto RF frequencies, also referred to as subcarriers, for transmission of the data by electromagnetic radiation. In the present embodiment, the CTL/SC/OFDM/LPSC PHY 1022 may impress the digital data as OFDM symbols encoded with tones onto the subcarriers to for transmission. The CTL/SC/OFDM/LPSC PHY 1022 may transform information signals into signals to be applied via the radio 1025, 1045 to elements of an antenna(s) 1024. An RF receiver receives electromagnetic energy at an RF frequency and extracts the digital data from the OFDM symbols.

In some embodiments, the communications device 1010 optionally comprises a Digital Beam Former (DBF) 1023, as indicated by the dashed lines. The DBF 1023 provides spatial filtering and is a signal processing technique used with antenna(s) 1024 for directional signal transmission or reception. This is achieved by combining elements in a phased antenna array of antenna(s) 1024 in such a way that signals at particular angles experience constructive interference while others experience destructive interference. Beamforming can be used at both the transmitting and receiving ends in order to achieve spatial selectivity. The antenna(s) 1024 may, in addition to one or more BT antennas, comprise an array of individual, separately excitable antenna elements for the 60 GHz communications. The signals applied to the elements of the antenna(s) 1024 cause the antenna(s) 1024 to radiate one to four spatial channels. Each spatial channel so formed may carry information to one or more of the communications devices 1030, 1050, and 1055. Similarly, the communications device 1030 comprises the transceiver (RX/TX) 1040 to receive and transmit signals from and to the communications device 1010. The transceiver (RX/TX) 1040 may comprise an antenna(s) 1044 and, optionally, a DBF 1043.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

Figure 2:
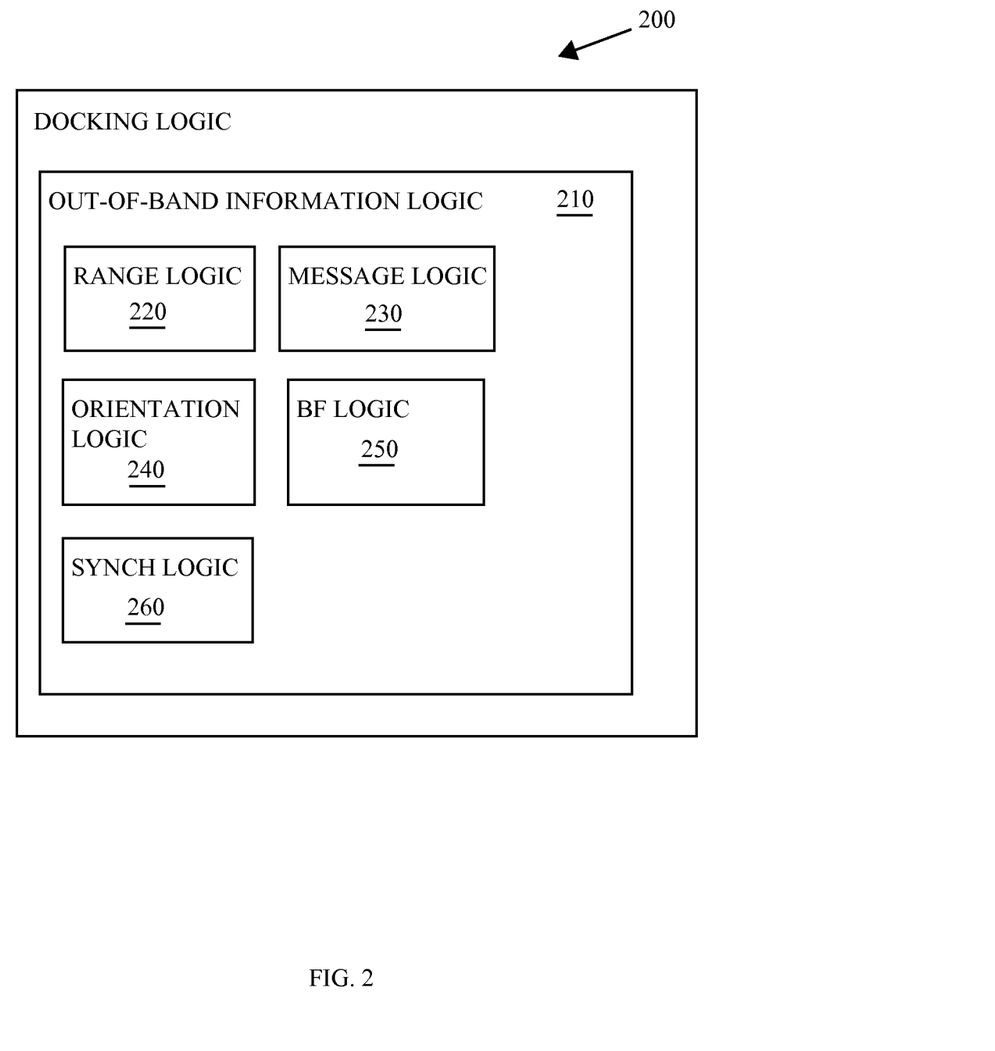
FIG. 2 depicts an embodiment of a docking logic.

FIG. 2 depicts an embodiment of docking logic 200. The docking logic 200 may perform functionality such as the docking logic of the communication devices 1010 and 1030 in FIG. 1. The docking logic 200 may comprise a combination of hardware and code to perform the functionality of determining information related to a link in the 60 GHz band. In many embodiments, the docking logic 200 may comprise code executing on a processor in a docking station and/or an application executing on a smartphone. In some embodiments, the docking logic 200 may comprise code executing on one of the two devices. In further embodiments, the docking logic 200 may comprise code executing on both of the devices that coordinate to provide information to the user and/or to the other device with which the device is attempting to form a link in the 60 GHz band.

In the present embodiment, the docking logic 200 may comprise out-of-band information logic 210. The out-of-band information logic 210 may be capable of interfacing with one or more different types of communications media, wired or wireless, such as the Bluetooth (BT) connection, to obtain information related to determining a failure in establishing a link in the 60 GHz band and/or maintaining a link in the 60 GHz band. Note that while many embodiments herein describe the out-of-band information from a BT connection, any other communication medium can alone or in conjunction with other communication media determine information and communicate information related to distance, orientation, and/or synchronization. For instance, another 2.4 GHz or 5 GHz wireless technology may provide a signal power indication that can be translated into a rough estimate of a distance. A 900 MHz communication medium may provide a medium for communicating information related to orientation of a device for determining if the orientation presents an issue with establishing the link in the 60 GHz band. The 900 MHz communication medium may also provide information related to synchronization to synchronize the transmission modes and receive modes of the devices such that one device may be in a transmit mode and transmit a beacon while the other device is in a receive mode and capable of receiving the beacon.

The out-of-band information logic 210 may comprise range logic 220, message logic 230, orientation logic 240, a beamforming (BF) logic 250, and synch logic 260. The range logic 220 may determine that the devices may be in range for establishing a link in the 60 GHz band. For embodiments such as BT, the range logic 220 may determine that if a BT connection is established, the devices may be close enough to establish a link in the 60 GHz band. Otherwise, the range logic 220 may determine a power indication for a received signal from one of the devices or an indication from a user that the two devices are within range and determine therefrom that an attempted connection has failed for a reason likely related to the orientation of one of the devices and/or an obstruction of a link in the 60 GHz band.

The message logic 230 may determine a message to inform a user that an obstruction and/or the orientation of a device is causing a failure to connect via a link in the 60 GHz band and may transmit the message to a display driver to display the message to a user. In other embodiments, the message may be an audible message, a vibration, or any other type of message configured to inform a user that an obstruction and/or the orientation of a device is causing a failure to connect via a link in the 60 GHz band. For instance, the message logic 230 may comprise one or more messages stored in memory that are configured to inform a user that an obstruction and/or the orientation of a device is causing a failure to connect via a link in the 60 GHz band. In some embodiments, for example, the message logic 230 may determine a message to inform the user to remove obstructions from the path between the two devices while the docking logic 200 concurrently calculates the distance based upon a signal power and/or communicates with corresponding docking logic in the other device to determine if the orientation of the other device may be a factor in causing establishment of a link in the 60 GHz band between the two devices to fail.

The orientation logic 240 may instruct an out-of-band communication system to query the other device about sensor information that describes the orientation of the other device and may determine, based upon the response, if the orientation is a factor in the failure to connect via a link in the 60 GHz band. For instance, some embodiments comprise antennas that are installed in such a way that the device should be upright with the antenna facing the other device in order to establish the best link in the 60 GHz band. If such a device is upside down, or inverted, the antenna may be directing communications into the desk or table on which the device lies. If the orientation logic 240 determines that the orientation of the device is inverted, the orientation logic 240 may instruct the message logic 230 to inform the user of that the orientation of the device is inverted and that the inverted device may be a reason for the failure to connect via the link in the 60 GHz band.

The BF logic 250 may determine that when an established link in the 60 GHz band fails, the connection may be improved by increasing the number of sectors used to determine the direction for communications between the two devices. In such embodiments, the BF logic 250 may instruct the MAC sublayer logic and/or the PHY logic to increase the number of sectors used to determine direction for the purposes of beamforming.

The synch logic 260 may synchronize the transmission of beacon frames for association through a link in the 60 GHz band and a receive mode between the two devices via an out-of-band connection such as a BT connection. For instance, the synch logic 260 may transmit a beacon time from a first device to a second device via a BT connection to inform the second device when to awake and be ready to receive a transmission via the link in the 60 GHz band.

Figure 3A:
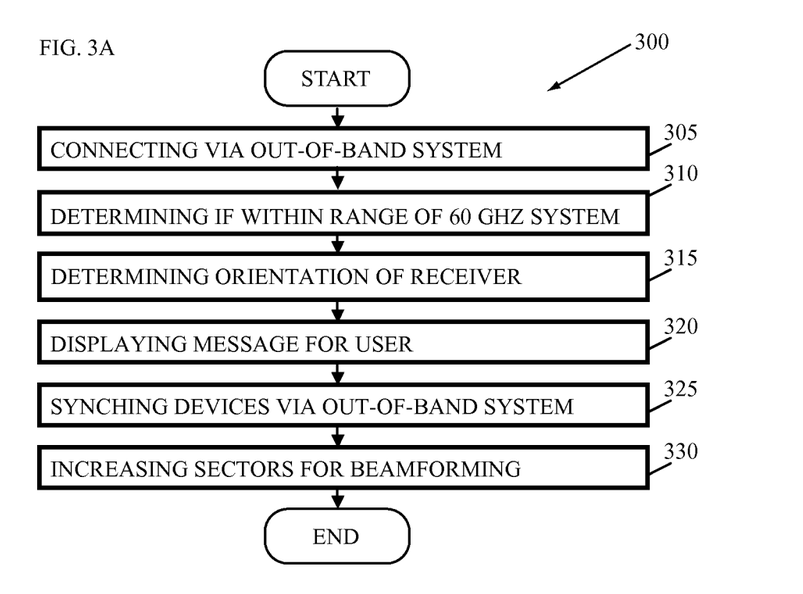
FIGS. 3A-B depict embodiments of flowcharts to implement docking logic for a transmitting device and a receiving device for a 60 GHz link.
Figure 3B:
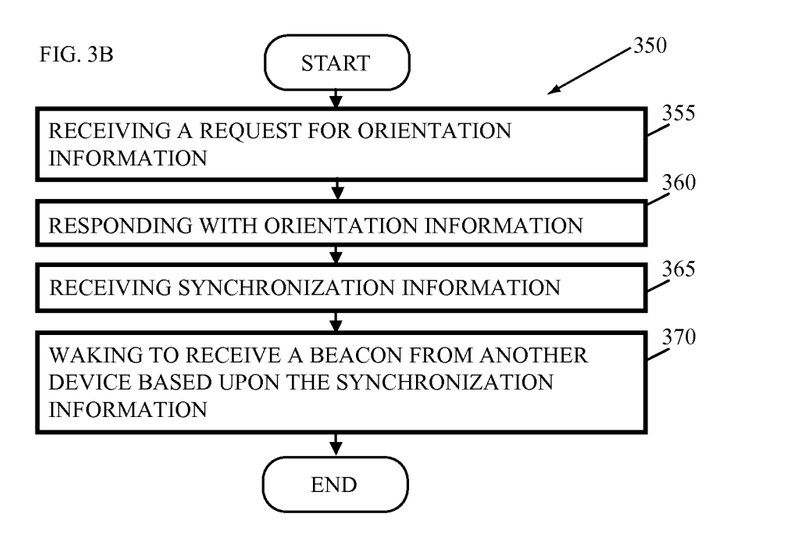

FIG. 3A-B depict embodiments of flowcharts 300 and 350 to implement docking logic for a transmitting device and a receiving device for a link in the 60 GHz band. In particular, FIG. 3A depicts an embodiment of a flowchart 300 to implement docking logic in, e.g., a docking station, which is actively attempting to connect to a receiving device via a link in the 60 GHz band. The flowchart 300 begins with connecting via an out-of-band system (element 305). In some embodiments, both the transmitting device and the receiving device may comprise the same out-of-band technology such as BT. In such embodiments, the docking logic may utilize information that can be gathered from or via the out-of-band system to detect and troubleshoot a problem with establishing a connection via a link in the 60 GHz band. In the present embodiment, the transmitting device and the receiving device may both have BT capabilities and the docking logic may detect that a connection is made via the BT system.

After determining that a connection is made via the out-of-band system, the docking logic may determine if the transmitting device and the receiving device are within range to establish a link in the 60 GHz band (element 310). In many embodiments, if one of the out-of-band systems is BT, the docking logic may determine that if the BT connection is established, there is a high probability that the transmitting device and the receiving device are within a distance that is within the range of the 60 GHz system so the docking logic may inform the transmitting device to transmit a discovery beacon. In other embodiments, the docking logic may determine a distance between the transmitting device and the receiving device based upon a signal power of a communication received by the transmitting device from the receiving device via the out-of-band system.

After, during, or before determining if the devices are within the range of the link in the 60 GHz band, the docking logic may transmit a query to the receiving device to request that the receiving device provide sensor information about the orientation of the receiving device via the out-of-band system (element 315). In many embodiments, if the receiving device comprises sensors indicating whether or not the device is inverted, the docking logic may request such sensor information to determine whether or not the receiving device is inverted.

After determining the range and the orientation information, and determining that an attempt to establish a link in the 60 GHz band failed despite the probability that the receiving device is within the range of the link in the 60 GHz band of the transmitting device, the docking logic may display or otherwise communicate a message to the user to indicate that an obstacle and/or the orientation of the receiving device may be a factor in causing the link in the 60 GHz band to fail (element 320).

In some embodiments, the docking logic may transmit synchronization information to the receiving device to reduce the time and power expenditure involved with a process of coordinating the transmission of a discovery beacon by the transmitting device and receipt of the discovery beacon by the receiving device (element 325). For instance, in several embodiments, the docking logic may transmit the synchronization information to the receiving device in response to the determination that the out-of-band connection has been established so that the transmitting device is transmitting the discovery beacon while the receiving device is awake and in a ready to receive mode.

In several embodiments, if the link in the 60 GHz band fails after having been established, the docking logic may increase the number of sectors involved in the beamforming process to potentially increase the received signal power at the receiving device for communications transmitted from the transmitting device (element 330).

FIG. 3B depicts an embodiment of a flowchart 350 to implement docking logic in a receiving device. The flowchart 350 begins with receiving a request for orientation information via an out-of-band system with respect to a 60 GHz system (element 355). In some embodiments, the receiving device may have, e.g., an accelerometer that can determine if the receiving device is inverted or upright. In many embodiments, the 60 GHz antenna(s) may be designed to function when the receiving device is upright. So docking logic in the receiving device may determine the orientation of the receiving device and indicate to the whether or not the receiving device is inverted via the out-of-band system (element 360).

The docking logic in the receiving device may also receive synchronization information (element 365) from a transmitting device for establishing a link in the 60 GHz band. The receiving device may enter a power save mode after receiving the synchronization information to save power. The receiving device may awake and enter a receive mode in time to receive a beacon from the transmitting device based upon the synchronization information received (element 370). For example, the synchronization information for the transmission time for a beacon from the transmitting device may be included in the out-of-band communication, allowing the receiving device to remain in the power save mode as long as possible before the transmission of the beacon from the transmitting device.

Figure 4A:
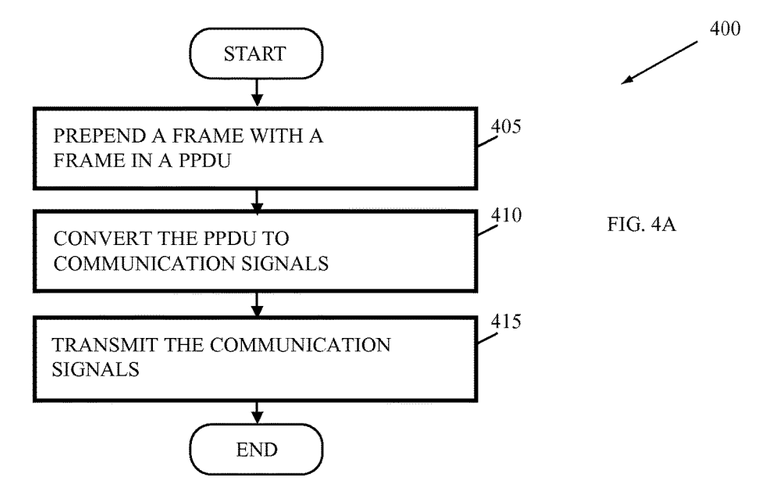
FIGS. 4A-B depict embodiments of flowcharts to transmit, receive, decode, and interpret communications with frames as illustrated in FIGS. 1-2.
Figure 4B:
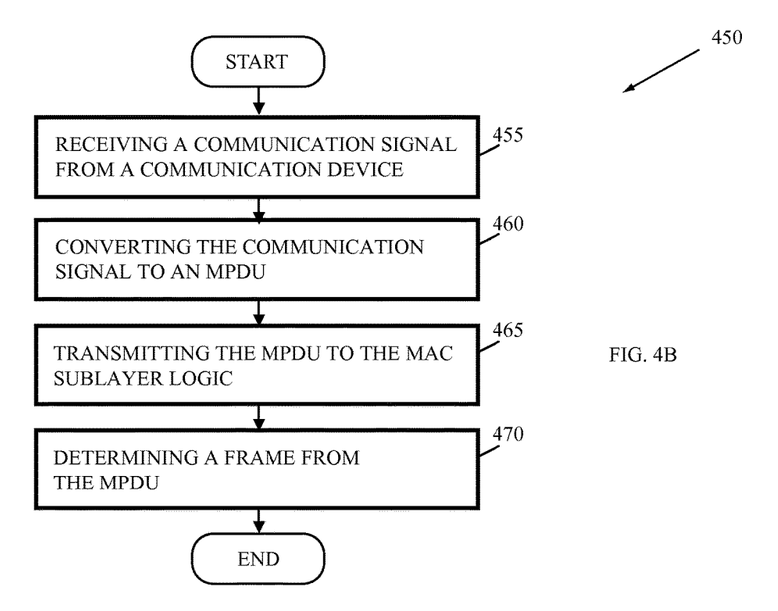

FIGS. 4A-B depict embodiments of flowcharts 400 and 450 to transmit, receive, and interpret communications with a frame. Referring to FIG. 4A, the flowchart 400 may begin with receiving a frame such as a discovery beacon from the frame builder to establish a link in the 60 GHz band with a second device. The MAC sublayer logic of the communications device may generate the frame as a management frame to transmit to the second device and may pass the frame as an MAC protocol data unit (MPDU) to a data unit builder that transforms the data into a packet that can be transmitted to the second device. The data unit builder may generate a preamble to prepend the PHY service data unit (PSDU) (the MPDU from the frame builder) to form a PHY protocol data unit (PPDU) for transmission (element 405). In some embodiments, more than one MPDU may be prepended in a PPDU.

The PPDU may then be transmitted to the physical layer device such as the transmitter 206 in FIG. 2 or the transceiver 1020, 1040 in FIG. 1 so the PPDU may be converted to communication signals (element 410). The transmitter may then transmit the communication signals via one or more antennas or an antenna array (element 415).

Referring to FIG. 4B, the flowchart 450 begins with a receiver of a first device such as the receiver portion of the transceiver 1040 in FIG. 1 receiving a communication signal via one or more antenna(s) such as an antenna element of antenna(s) 1044 (element 455). The receiver may convert the communication signal into an MPDU in accordance with the process described in the preamble (element 460). More specifically, the received signal is fed from the one or more antennas to a DBF. The DBF processes the signal with spatial selectivity based on the direction of receipt. The output of the DBF is fed to SC PHY/OFDM PHY.

In many embodiments, the SC PHY may be implemented for beacons, probe requests, and association requests. The SC PHY may extract signal information from the information-bearing signals are modulated. Then, the demodulator demodulates the signal information via, e.g., BPSK, QPSK, 16-QAM and 64-QAM. The signal may be deinterleaved and the frequency segments may then be deparsed.

The decoder may decode the signal information from the demodulator via, e.g., BCC or LDPC, to extract the MPDU (element 460) and transmit the MPDU to MAC sublayer logic such as MAC sublayer logic (element 465).

The MAC sublayer logic may determine frame field values from the MPDU (element 470) the frame control field. For instance, the MAC sublayer logic may determine frame field values such as a service set identifier (SSID) for the transmitting device and, in some embodiments, a timestamp and sector-sweep information.

The following examples pertain to further embodiments. One example comprises an apparatus to identify an issue with establishment of a link. The apparatus may comprise a host Bluetooth device; a physical layer device; logic coupled with the host Bluetooth device and coupled with the physical layer device to determine establishment of a Bluetooth connection between a first station and a second station; coupled with the physical layer device to determine a failure to establish a connection to between the first station and the second station via a link in the 60 gigahertz band; and to display a message indicative of a physical issue with establishing the link in the 60 gigahertz band, wherein the message is indicative of at least an orientation issue or an obstruction issue.

In some embodiments, the apparatus may further comprise a processor, a memory coupled with the processor, a radio coupled with the physical layer device, and one or more antennas coupled with the radio to transmit the packets. In some embodiments, the logic comprises logic to synchronize the transmission of beacon frames for association and a receive mode between the first station and the second station via the Bluetooth connection. In some embodiments, the logic comprises logic to determine a distance based upon a power indication associated with receipt of a Bluetooth signal by the second station and determine that the distance is within a range associated with the link in the 60 gigahertz band. In some embodiments, the logic comprises logic to query the first station via the Bluetooth connection about sensor information indicative of the orientation of the first station being inverted. In some embodiments, the logic comprises logic to increase a number of sectors associated with beamforming in response to the failure to maintain the connection via the link in the 60 gigahertz band.

Another embodiment comprises one or more tangible computer-readable non-transitory storage media comprising computer-executable instructions operable to, when executed by at least one computer processor, enable the at least one computer processor to implement a method. The method may comprise determining establishment of a Bluetooth connection between a first station and a second station; determining a failure to establish a connection to between the first station and the second station via a link in the 60 gigahertz band; and determining a message to display, the message indicative of a physical issue with establishing the link in the 60 gigahertz band, wherein the message is indicative of at least an orientation issue or an obstruction issue.

In some embodiments, the storage media may further comprise synchronizing the transmission of beacon frames for association and a receive mode between the first station and the second station via the Bluetooth connection. In some embodiments, the storage media may further comprise determining a distance based upon a power indication associated with receipt of a Bluetooth signal by the second station and determining that the distance is within a range associated with the link in the 60 gigahertz band. In some embodiments, the storage media may further comprise querying the first station via the Bluetooth connection about sensor information indicative of the orientation of the first station being inverted. In some embodiments, the storage media may further comprise increasing a number of sectors associated with beamforming in response to the failure to maintain the connection via the link in the 60 gigahertz band.

Another embodiment comprises a method to identify an issue with establishment of a link. The method may comprise determining establishment of a Bluetooth connection between a first station and a second station; determining a failure to establish a connection to between the first station and the second station via a link in the 60 gigahertz band; and determining a message to display, the message indicative of a physical issue with establishing the link in the 60 gigahertz band, wherein the message is indicative of at least an orientation issue or an obstruction issue.

In some embodiments, the method may further comprise synchronizing the transmission of beacon frames for association and a receive mode between the first station and the second station via the Bluetooth connection. In some embodiments, the method may further comprise determining a distance based upon a power indication associated with receipt of a Bluetooth signal by the second station and determining that the distance is within a range associated with the link in the 60 gigahertz band. In some embodiments, the method may further comprise querying the first station via the Bluetooth connection about sensor information indicative of the orientation of the first station being inverted. In some embodiments, the method may further comprise increasing a number of sectors associated with beamforming in response to the failure to maintain the connection via the link in the 60 gigahertz band.

Another embodiment comprises a system to identify an issue with establishment of a link. The system may comprise a processor; a memory coupled with the processor; a host Bluetooth device; a Bluetooth radio controller; a physical layer device; logic coupled with the host Bluetooth device and coupled with the physical layer device to determine establishment of a Bluetooth connection between a first station and a second station; coupled with the physical layer device to determine a failure to establish a connection to between the first station and the second station via a link in the 60 gigahertz band; and to display a message indicative of a physical issue with establishing the link in the 60 gigahertz band, wherein the message is indicative of at least an orientation issue or an obstruction issue; and antennas coupled with the radio to transmit the packets and the Bluetooth radio controller.

In some embodiments, the logic comprises logic to synchronize the transmission of beacon frames for association and a receive mode between the first station and the second station via the Bluetooth connection. In some embodiments, the logic comprises logic to determine a distance based upon a power indication associated with receipt of a Bluetooth signal by the second station and determine that the distance is within a range associated with the link in the 60 gigahertz band. In some embodiments, the logic comprises logic to query the first station via the Bluetooth connection about sensor information indicative of the orientation of the first station being inverted. In some embodiments, the logic comprises logic to increase a number of sectors associated with beamforming in response to the failure to maintain the connection via the link in the 60 gigahertz band.

Another embodiment comprises an apparatus to establish a link. The apparatus may comprise a host Bluetooth device; a physical layer device; logic coupled with the host Bluetooth device and coupled with the physical layer device to determine establishment of a Bluetooth connection between a first station and a second station; receiving a communication via Bluetooth connection to indicating a synchronization time for associating with the second station via a beacon transmission; and waking a 60 gigahertz system at the synchronization time to associate with the second station.

In some embodiments, the apparatus may further comprise a processor, a memory coupled with the processor, a radio coupled with the physical layer device, and one or more antennas coupled with the radio to receive the packets. In some embodiments, the logic comprises logic to respond to a query from the second station via the Bluetooth connection with sensor information indicative of the orientation of the first station. In some embodiments, the logic comprises logic to enter a receive mode to receive a beacon from the second station at the synchronization time. In some embodiments, the logic comprises logic to enter a transmit mode to transmit a beacon to the second station at the synchronization time.

Another embodiment comprises one or more tangible computer-readable non-transitory storage media comprising computer-executable instructions operable to, when executed by at least one computer processor, enable the at least one computer processor to implement a method. The method may comprise determining establishment of a Bluetooth connection between a first station and a second station; receiving a communication via Bluetooth connection to indicating a synchronization time for associating with the second station via a beacon transmission; and waking a 60 gigahertz system at the synchronization time to associate with the second station.

In some embodiments, the storage media may further comprise responding to a query from the second station via the Bluetooth connection with sensor information indicative of the orientation of the first station. In some embodiments, waking the 60 gigahertz system comprises entering a receive mode to receive a beacon from the second station at the synchronization time. In some embodiments, waking the 60 gigahertz system comprises entering a transmit mode to transmit a beacon to the second station at the synchronization time.

Another embodiment comprises a system to establish a link. The system may comprise a processor; a memory coupled with the processor; a host Bluetooth device; a Bluetooth radio controller; a physical layer device; logic coupled with the host Bluetooth device and coupled with the physical layer device to determine establishment of a Bluetooth connection between a first station and a second station; receiving a communication via Bluetooth connection to indicating a synchronization time for associating with the second station via a beacon transmission; and waking a 60 gigahertz system at the synchronization time to associate with the second station; and antennas coupled with the radio to transmit the packets and the Bluetooth radio controller.

In some embodiments, the logic comprises logic to respond to a query from the second station via the Bluetooth connection with sensor information indicative of the orientation of the first station. In some embodiments, the logic comprises logic to enter a receive mode to receive a beacon from the second station at the synchronization time. In some embodiments, the logic comprises logic to enter a transmit mode to transmit a beacon to the second station at the synchronization time.

Another embodiment comprises a method to establish a link. The method may comprise determining establishment of a Bluetooth connection between a first station and a second station; receiving a communication via Bluetooth connection to indicating a synchronization time for associating with the second station via a beacon transmission; and waking a 60 gigahertz system at the synchronization time to associate with the second station.

In some embodiments, the method may further comprise responding to a query from the second station via the Bluetooth connection with sensor information indicative of the orientation of the first station. In some embodiments, waking the 60 gigahertz system comprises entering a receive mode to receive a beacon from the second station at the synchronization time. In some embodiments, waking the 60 gigahertz system comprises entering a transmit mode to transmit a beacon to the second station at the synchronization time.

Another embodiment comprises an apparatus to identify an issue with establishment of a link. The apparatus may comprise a means for determining establishment of a Bluetooth connection between a first station and a second station; a means for determining a failure to establish a connection to between the first station and the second station via a link in the 60 gigahertz band; and a means for determining a message to display, the message indicative of a physical issue with establishing the link in the 60 gigahertz band, wherein the message is indicative of at least an orientation issue or an obstruction issue.

In some embodiments, the apparatus may further comprise a means for synchronizing the transmission of beacon frames for association and a receive mode between the first station and the second station via the Bluetooth connection. In some embodiments, the apparatus may further comprise a means for determining a distance based upon a power indication associated with receipt of a Bluetooth signal by the second station and a means for determining that the distance is within a range associated with the link in the 60 gigahertz band. In some embodiments, the apparatus may further comprise a means for querying the first station via the Bluetooth connection about sensor information indicative of the orientation of the first station being inverted. In some embodiments, the apparatus may further comprise a means for increasing a number of sectors associated with beamforming in response to the failure to maintain the connection via the link in the 60 gigahertz band.

Another embodiment comprises an apparatus to establish a link. The apparatus may comprise a means for determining establishment of a Bluetooth connection between a first station and a second station; a means for receiving a communication via Bluetooth connection to indicating a synchronization time for associating with the second station via a beacon transmission; and a means for waking a 60 gigahertz system at the synchronization time to associate with the second station.

In some embodiments, the apparatus may further comprise a means for responding to a query from the second station via the Bluetooth connection with sensor information indicative of the orientation of the first station. In some embodiments, the means for waking the 60 gigahertz system comprises a means for entering a receive mode to receive a beacon from the second station at the synchronization time. In some embodiments, the means for waking the 60 gigahertz system comprises a means for entering a transmit mode to transmit a beacon to the second station at the synchronization time.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

A number of embodiments may have one or more advantageous effects. For instance, some embodiments may offer reduced MAC header sizes with respect to standard MAC header sizes. Further embodiments may include one or more advantageous effects such as smaller packet sizes for more efficient transmission, lower power consumption due to less data traffic on both the transmitter and receiver sides of communications, less traffic conflicts, less latency awaiting transmission or receipt of packets, and the like.

Another embodiment is implemented as a program product for implementing systems and methods described with reference to FIGS. 1-4. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus to facilitate establishment of a link, the apparatus comprising:
   a host Bluetooth device;
   a physical layer device;
   logic coupled with the host bluetooth device and coupled with the physical layer device to determine establishment of a bluetooth connection between a first station and a second station; determine that the first station and the second station are within a range to establish a link in an about 60 gigahertz band; determine a failure to establish a connection to between the first station and the second station via the link in the about 60 gigahertz band; determine, in response to determination of the failure and in response to determination that the first station and the second station are within the range, that the failure to establish the connection between the first station and the second station via the link in the about 60 gigahertz band is based upon an orientation issue or obstruction issue; query the first station via the bluetooth connection about sensor information indicative of an orientation of the first station; determine if the orientation of the first station is a factor in the failure to establish the connection between the first station and the second station via the link in the about 60 gigahertz band and to display a message indicative of the obstruction issue in response to determining if the orientation of the first station is a factor in the failure to establish the connection.

2. The apparatus of claim 1, further comprising a processor, a memory coupled with the processor, a radio coupled with the physical layer device, and one or more antennas coupled with the radio to transmit packets.

3. The apparatus of claim 1, wherein the logic comprises logic to synchronize transmission of beacon frames for association and a receive mode between the first station and the second station via the bluetooth connection.

4. The apparatus of claim 1, wherein the logic comprises logic to determine a distance based upon a power indication associated with receipt of a bluetooth signal by the second station and determine that the distance is within a range associated with the link in the about 60 gigahertz band.

5. The apparatus of claim 1, wherein the logic comprises logic to increase a number of sectors associated with beamforming in response to the failure to maintain the connection via the link in the about 60 gigahertz band.

6. One or more tangible computer-readable non-transitory storage media comprising computer-executable instructions operable to, when executed by at least one computer processor, enable the at least one computer processor to implement a method comprising:
determining establishment of a bluetooth connection between a first station and a second station;
determining that the first station and the second station are within a range to establish a link in an about 60 gigahertz band;
determining a failure to establish a connection to between the first station and the second station via the link in the about 60 gigahertz band;
determining, in response to determining the failure and in response to determining that the first station and the second station are within the range, that the failure to establish the connection between the first station and the second station via the link in the about 60 gigahertz band is based upon an orientation issue or obstruction issue;
querying the first station via the bluetooth connection about sensor information indicative of an orientation of the first station;
determining if orientation of the first station is a factor in the failure to establish the connection between the first station and the second station via the link in the about 60 gigahertz band; and
determining a message to display, the message indicative of the obstruction issue in response to determining if the orientation of the first station is a factor in the failure to establish the connection.

7. The storage media of claim 6, further comprising synchronizing transmission of beacon frames for association and a receive mode between the first station and the second station via the bluetooth connection.

8. The storage media of claim 6, further comprising determining a distance based upon a power indication associated with receipt of a bluetooth signal by the second station and determining that the distance is within a range associated with the link in the about 60 gigahertz band.

9. The storage media of claim 6, further comprising increasing a number of sectors associated with beamforming in response to the failure to maintain the connection via the link in the about 60 gigahertz band.

10. A method to facilitate establishment of a link, the method comprising:
determining establishment of a bluetooth connection between a first station and a second station;
determining that the first station and the second station are within a range to establish a link in an about 60 gigahertz band;
determining a failure to establish a connection to between the first station and the second station via the link in the about 60 gigahertz band;
determining, in response to determining the failure and in response to determining that the first station and the second station are within the range, that the failure to establish the connection between the first station and the second station via the link in the about 60 gigahertz band is based upon an orientation issue or obstruction issue;
querying the first station via the bluetooth connection about sensor information indicative of an orientation of the first station;
determining if orientation of the first station is a factor in the failure to establish the connection between the first station and the second station via the link in the about 60 gigahertz band; and
determining a message to display, the message indicative of the obstruction issue in response to determining if the orientation of the first station is a factor in the failure to establish the connection.

11. The method of claim 10, further comprising synchronizing the transmission of beacon frames for association and a receive mode between the first station and the second station via the bluetooth connection.

12. The method of claim 10, further comprising determining a distance based upon a power indication associated with receipt of a bluetooth signal by the second station and determining that the distance is within a range associated with the link in the about 60 gigahertz band.

13. The method of claim 10, further comprising increasing a number of sectors associated with beamforming in response to the failure to maintain the connection via the link in the about 60 gigahertz band.

14. An apparatus to facilitate establishment of a link, the apparatus comprising:
a host bluetooth device;
a physical layer device;
logic coupled with the host bluetooth device and coupled with the physical layer device to determine establishment of a bluetooth connection between a first station and a second station; receive a communication via the bluetooth connection comprising a timestamp and a beacon time to associate with the second station via a beacon transmission; wake an about 60 gigahertz system at a synchronization time to associate with the second station; determine a failure to establish a connection to between the first station and the second station via the link in the about 60 gigahertz band; determine, in response to determination of the failure, that the failure to establish the connection between the first station and the second station via the link in the about 60 gigahertz band is based upon an orientation issue or obstruction issue; communicate with the second station via the bluetooth connection about sensor information indicative of orientation; determine if orientation of the first station is a factor in the failure to establish the connection between the first station and the second station via the link in the about 60 gigahertz band; and to display a message to inform a user about the obstruction issue with establishing the link in the about 60 gigahertz band in response to determining if the orientation of the first station is a factor in the failure to establish the connection.

15. The apparatus of claim 14, further comprising a processor, a memory coupled with the processor, a radio coupled with the physical layer device, and one or more antennas coupled with the radio to receive packets.

16. The apparatus of claim 14, wherein the logic comprises logic to respond to a query from the second station via the bluetooth connection with sensor information indicative of the orientation of the first station.

17. The apparatus of claim 14, wherein the logic comprises logic to enter a receive mode to receive a beacon from the second station at the synchronization time.

18. One or more tangible computer-readable non-transitory storage media comprising computer-executable instructions operable to, when executed by at least one computer processor, enable the at least one computer processor to implement a method comprising:
   determining establishment of a bluetooth connection between a first station and a second station;
   receiving a communication via bluetooth connection to indicating a synchronization time for associating with the second station via a beacon transmission;
   waking an about 60 gigahertz system at the synchronization time to associate with the second station;
   determining a failure to establish a connection to between the first station and the second station via a link in an about 60 gigahertz band;
   determining, in response to determining the failure, that the failure to establish the connection between the first station and the second station via the link in the about 60 gigahertz band is based upon an orientation issue or obstruction issue;
   communicating with the second station via the bluetooth connection about sensor information indicative of orientation;
   determining if orientation of the first station is a factor in the failure to establish the connection between the first station and the second station via the link in the about 60 gigahertz band; and
   determining a message to display to inform a user about the obstruction issue with establishing the link in the about 60 gigahertz band in response to determining if the orientation of the first station is a factor in the failure to establish the connection.

19. The storage media of claim 18, wherein communicating with the second station comprises responding to a query from the second station via the bluetooth connection with sensor information indicative of an orientation of the first station.

20. The storage media of claim 18, wherein waking the about 60 gigahertz system comprises entering a receive mode to receive a beacon from the second station at the synchronization time.

21. A method to establish a link, the method comprising:
   determining establishment of a bluetooth connection between a first station and a second station;
   receiving a communication via the bluetooth connection to indicating a synchronization time for associating with the second station via a beacon transmission;
   waking an about 60 gigahertz system at the synchronization time to associate with the second station;
   determining a failure to establish a connection to between the first station and the second station via a link in an about 60 gigahertz band;
   determining, in response to determining the failure, that the failure to establish the connection between the first station and the second station via the link in the about 60 gigahertz band is based upon an orientation issue or obstruction issue;
   communicating with the second station via the bluetooth connection about sensor information indicative of orientation;
   determining if orientation of the first station is a factor in the failure to establish the connection between the first station and the second station via the link in the about 60 gigahertz band; and
   determining a message to display to inform a user about the obstruction issue with establishing the link in the about 60 gigahertz band in response to determining if the orientation of the first station is a factor in the failure to establish the connection.

22. The method of claim 21, wherein communicating with the second station comprises responding to a query from the second station via the bluetooth connection with sensor information indicative of an orientation of the first station.

23. The method of claim 21, wherein waking the about 60 gigahertz system comprises entering a receive mode to receive a beacon from the second station at the synchronization time.

* * * * *